(12) United States Patent
Brixius (10) Patent No.: US 7,376,615 B2
(45) Date of Patent: May 20, 2008

(54) RESTRICTED SECURITIES PROCESSING (75) Inventor: John Brixius, New York, NY (US)

(73) Assignee: Goldman Sachs & Co., New York, NY (US)

( * ) Notice: Subject to any disclaimer, the term of this patent is extended or adjusted under 35 U.S.C. 154(b) by 1431 days.

(21) Appl. No.: 09/751,721

(22) Filed: Dec. 29, 2000

(65) Prior Publication Data
US 2002/0038275 A1 Mar. 28, 2002

Related U.S. Application Data (60) Provisional application No. 60/236,299, filed on Sep. 28, 2000.

(51) Int. Cl.
G06Q 40/00 (2006.01)

(52) U.S. Cl. .......................... 705/37; 705/35

(58) Field of Classification Search ................ 705/37, 705/35
See application file for complete search history.

(56) References Cited

U.S. PATENT DOCUMENTS

| | | | |
|---|---|---|---|
| 6,269,346 B1 * | 7/2001 | Cristofich et al. ............ | 705/37 |
| 2002/0007335 A1 * | 1/2002 | Millard et al. ................ | 705/37 |
| 2002/0042771 A1 * | 4/2002 | Shields et al. ................ | 705/37 |
| 2002/0059107 A1 * | 5/2002 | Reich et al. .................. | 705/26 |

OTHER PUBLICATIONS

Michaels, Jenna; Compliance Under Control; Wall Street and Technology; May 1997, vol. 9, Issue 9; p. 17.*
Study outlines need to automate market, USA Today, Dec. 15, 1991.*

* cited by examiner

Primary Examiner—Jagdish N Patel
(74) Attorney, Agent, or Firm—Chadbourne & Parke LLP; Walter G. Hanchuk (57) ABSTRACT A method and system is provided to automate many of the steps involved in processing restricted securities. Data can be received relating to restrictions associated with the trade of a security. Typically the data includes notification by a seller of their desire to transact a trade involving a restricted security as well as answers to a checklist of questions related to the restricted trade. In addition, the system can receive an electronic verification that the data is correct. The system can respond by automatically generating documentation supportive of the trade and receiving an electronic signature to execute the generated documents. Trade information can also be automatically forwarded to a clearing house. In addition, an instruction can be transmitted to a transfer agent to convert physical restricted securities into an electronic format. Notification that the securities have been converted can subsequently be received.

19 Claims, 8 Drawing Sheets

IS CLIENT AN AFFILIATE? — 501
Shares Held — 502
Volume Limitations — 503
Date of Last Filing — 504
Officer, Director or other roles — 504
Relation to other shareholders — 505

HOW STOCK WAS ACQUIRED?
Nature/Date of Acquisition — 506
Form of Payments — 507
Private Placement — 508
Public Market Purchase — 509
145 Transactions — 510
Other — 511

REGISTRATION STATEMENT FOR RESALES? — 512

IS CLIENT SUBJECT TO TRADING WINDOW? — 513

RESTRICTIVE LEGEND ON CERTIFICATE? — 514

CONTRACTUAL RESTRICTIONS (lock-ups, derivative restrictions, ec)? — 515

ADDITIONAL COMMENTS — 516

RESTRICTED SECURITIES PROCESSING

CROSS REFERENCE TO RELATED APPLICATIONS

This application claims the benefit of a provisional application entitled "Restricted Securities Processing" filed Sep. 28, 2000 and bearing the Ser. No. 60/236,299 the contents of which are relied upon and incorporated by reference.

BACKGROUND

The present invention relates to a method and system for providing automated trading and processing of restricted securities. In particular the present invention relates to an automated system and process to transform restricted securities processing (RSP) from being a slow and inconsistent process into an industry benchmark, and possibly a competitive advantage as a distinct and significant source of value creation for a financial institution.

Several conditions can distinguish RSP from non-RSP and are the dominant root causes for process inefficiencies: RSP requires extra "legal" process steps that culminate with a Transfer Agent's review of a Legal Opinion from Company Counsel. A Broker's Letter and Seller's Letter can be inputs wherein the primary purpose of the letters is to facilitate the generation of a Legal Opinion by Company Counsel. The Legal Opinion typically states that Company Counsel believes a trade involving restricted securities meets regulations.

Restricted securities are almost always physical documents while non-restricted securities are almost always electronic. In addition, restricted securities uniquely require legends. In present markets, physical restricted securities can be replaced by electronic positions on the books and records of the Transfer Agent with a stop order, however, this does not usually happen.

The conditions of being restricted and being physical are not one and the same, they can be separated, such as via Transfer Agent (TA) books-and-records. However, both conditions require manually intensive, inefficient, non-standard processes with poor quality control and lagging status.

In general, the prior art has shown that when a Client desires to sell restricted stock the client will call their Broker to inform them of their desire. Typically, the associated restricted stock security will already be retained by the Broker in a vault and the Broker will have some indication of a restriction applying. The Broker will typically have a pre-signed Seller's Letter with blanks for the date, rule of sale, amount to be sold and potentially other transaction specific information. The Broker and the Client, who is now a Seller, will attempt to determine an appropriate rule for sale, and whether or not the Seller meets the requirements. If they are not able to do so, the Broker and/or Seller may call the Broker's internal Restriction Desk; the Client's Counsel, or the Company Counsel to determine the appropriate rule for sale.

When the appropriate rule of sale has been ascertained, the Broker will fill in the pre-signed Seller's Letter. If the Broker does not have a pre-signed Seller's Letter on hand, they will fax the filled in Letter to the Client for signature, and the Client will then fax the signed letter back to the Broker or directly to Company Counsel. The Broker will also fill out and sign a Broker's Letter. The Broker will then determine the identity of Company Counsel in order to fax both the Seller's and Broker's Letter. The Broker will also call Company Counsel to inform them of the impending fax and give a transaction overview, and then fax the letters. Upon receipt of the faxed letters, Company Counsel will review the letters to determine if the appropriate rule has been identified and that the conditions under the rule are met. If so, Company Counsel creates and signs a Legal Opinion stating that they believe conditions for sale have been met. Company Counsel will also identify the Transfer Agent, and fax the Legal Opinion to the Transfer Agent.

In the early part of the process when the Client first calls the Broker to place the sale, the Broker will also receive from the Seller an original signed document of negotiability to forward to the Transfer Agent. If the security is on deposit in the Broker's vault, typically the Broker will have had previously given the Client a stock power which if signed by the Client, can act as documentation of negotiability. During a call to the Broker, the Broker will inform the Client to sign the stock power and physically send it, typically via an overnight service, to the Broker. If the security is in the possession of the Client or another source, the Broker will typically inform the Client to sign the security itself. The signed security can be used as the document of negotiability and forward it to the Broker. However it is accomplished, both a signed document of negotiability and the security itself must be delivered to the Transfer Agent to complete the transfer. The Broker will put events into action to ensure both items are received into the Broker's possession to be forwarded to the Transfer Agent.

Typically, the Transfer Agent will not begin the transfer process until it has received either a faxed copy or original of the signed Legal Opinion. In addition the transfer agent will require an original security along with an original signed document of negotiability.

The Transfer Agent will sort through piles of packages of negotiability documentation which typically arrive through an overnight service, and stacks of faxes of Legal Opinions to match the appropriate Legal Opinion to the appropriate security package. Alternatively, some Transfer Agents request that the Broker take receipt of the fax from Company Counsel and package this letter with the security package to eliminate the laborious task of doing this themselves. Upon completing this task, the Transfer Agent will initiate the transfer process, which includes destroying the old certificate and either reissuing a new physical security or moving the security to electronic form in a trust company environment, such as the Depository Trust Company. The only way the Broker can identify that the transfer has been complete is to go into a trust company system and search, or call the transfer agent and inquire. Overall, this process may require from one to three weeks and occasionally even longer.

What is needed is a method and system to automate Restricted Securities Processing and provide a timely, secure, platform for trading restricted securities.

SUMMARY

Accordingly a method and system is provided to automate many of the steps involved in processing restricted securities and utilize an electronic platform to exchange documents, information and authorizations.

The present invention includes a computer-implemented method for processing restricted securities trades via a communications network. Data can be received relating to restrictions associated with the trade of a security. Typically the data includes notification by a seller of their desire to transact a trade involving a restricted security as well as answers to a checklist of questions related to the restricted trade. In addition, the system will receive an electronic verification that the data is correct. The system can respond by automatically generating documentation supportive of the trade and receiving an electronic signature to execute the generated documents. Typically the trade will be a simple restricted sale and the system will perform the step of transmitting an instruction to execute the trade. Trade information can also be automatically forwarded to a clearinghouse.

Documentation that is generated can include a seller's letter, a broker's letter and/or a legal opinion. Edits to the generated documentation can also be received and processed to modify the documents accordingly. In addition, an instruction can be transmitted to a transfer agent to convert physical restricted securities into an electronic format. Notification that the securities have been converted can subsequently be received.

Another embodiment of the present invention includes a computer system for facilitating trading of a restricted security. A computer server accessible with a network access device via a communications network executes software stored on the server. The software is operative with the server to cause the system to transmit data relating to a restricted securities trade. The server will receive an electronic document such as a legal opinion related to the trade, as well as receive electronic authorization to proceed with the trade. The computer can then transmit a command to execute trade. The network access device can be a computer, handheld device or other electronic communication device.

The computer communication network can conform to the transmission control protocol/internet protocol and include the Internet and/or an intranet.

Other embodiments include computer executable program code residing on a computer-readable medium. The program code can include instructions for causing a computer to transmit data relating to a restricted securities trade and receive documentation, such as a Legal Opinion related to the trade. The computer can also receive electronic authorization to proceed with the trade and transmit a command to execute trade.

In another aspect of the present invention, a method of interacting with a network access device in order to complete an online transaction is presented. A user can initiate interaction with a host computer via a communications network and transmitting data related to a trade involving a restricted security. Documentation related to the trade of the restricted security can be received and an electronic authorization to conduct the trade can be transmitted. In one embodiment, a data stream content can be viewed via a graphical user interface. The documentation received can include a legal opinion, a broker's letter, a seller's letter or other documentation.

In addition, a computer signal can be embodied in a digital data stream relating to restricted security trading. The computer signal can be generated by any of the methods discussed above.

In the present invention, hardcopy legal documents are largely replaced by electronic documents and communications. Hardcopy documents can be made available for archival purposes, but are no longer essential to the processing of restricted securities. Workflow is integrated into an electronic RSP system allowing a Transfer Agent and bank Transfer Custody to seamlessly share information and work in real time. An alternative to using workflow would be to use a peer-to-peer computing platform whereby information stored on the transfer agent's, company counsel's, the broker's, or an independent hub system can be coordinated and communicated to achieve a similar result. Electronic authorizations can be utilized throughout, creating completely electronic process steps for generating a legal opinion. Real time processing can essentially be achieved by automation of the electronic signature processes. Company Counsel and the Transfer Agent are able to access legal summaries via a distributed network such as the Internet and can also review legal documents in full or download a hardcopy for archival purposes.

Physical restricted securities can be replaced with electronic versions that exist on the books and records of the transfer agent with a stop order that can only be lifted upon completion of the legal opinion. Electronic security can thereby be electronically linked to an electronic legal opinion process and further automation. A RSP system can also be utilized as a trading platform and clearance application wherein transfer of ownership of restricted securities can occur by changing the identity of the owner of the shares on the electronic books and records of the Transfer Agent, and not through a trust company.

Linking another broker involved in the trade to the RSP system can enable them to accept the trade and also send the results of the new owner to the transfer agent. The transfer agent can complete the transaction through the RSP system without any involvement from trust company. This process can be used for non-restricted securities as well as restricted securities, and can be utilized to create a secondary trading platform for any security that can be placed on the books and records of a Transfer Agent or like party.

DESCRIPTION

The present invention includes a computerized method and system for providing restricted securities processing in a time efficient and secure fashion. Automated process flows that allow for the transfer of documents via an electronic communications network eliminate many manual and time consuming steps formerly required to effect a transaction involving restricted securities. In addition, electronic signatures can be utilized to further expedite the approval of legally binding documents. The method and system can be modified to accommodate margin, venture capital distributions, restricted convertible securities or other restricted securities. In addition, the use of electronic positions on the books and records of a Transfer Agent with stop orders in place of the physical format of restricted securities can further automate and optimize the process.

Figure 1:
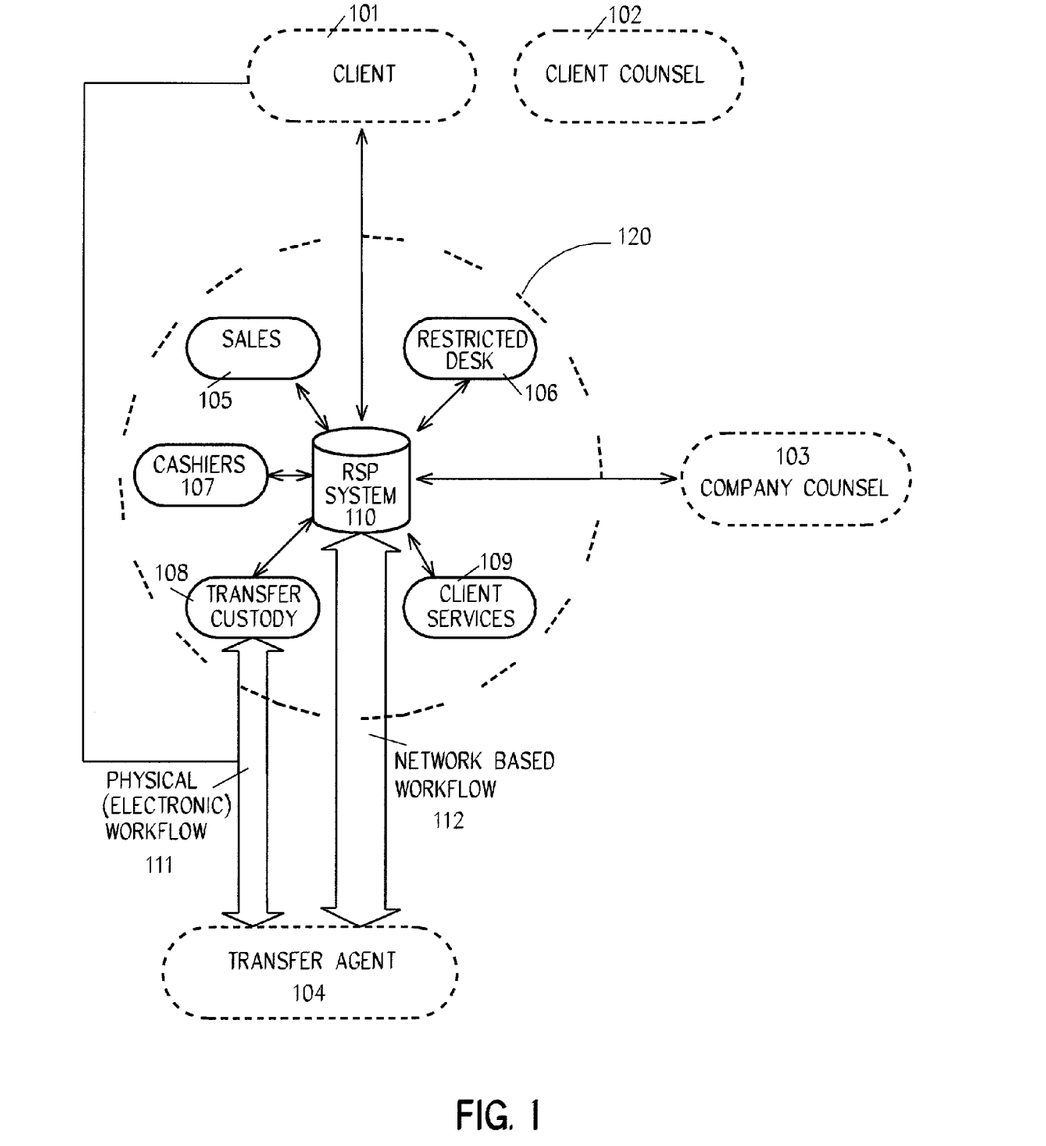
FIG. 1 illustrates a block diagram of restricted securities processing system.

Referring now to FIG. 1, a block diagram illustrates information flows according to the present invention between major entities involved in a restricted security transaction. A hub and spoke or peer to peer architecture is combined with a methodology to eliminate several manual steps required by previous processes. Electronic signature authorization is integrated in the process such that a Client 101, Client Counsel 102, Company Counsel 103, Transfer Agent 104 and entities 105-109 within a financial institution 120 can now use the Restricted Securities Processing (RSP) system 110 to electronically execute process steps. The financial institution 120 can have an electronic network workflow 112 with the Transfer Agent 104 such that a previously required physical delivery can be reengineered to be electronic. In this embodiment the Broker and the RSP system are integrated as one. An alternate arrangement would be for the Broker to be an external party to the RSP system just as are the Company Counsel and Transfer Agent. In such an arrangement, the Broker could access the RSP system either through a browser to manually read or write information to the RSP system, or alternative could use a Workflow application or peer-to-peer computing arrangement to electronically share information with the RSP system.

Typically, under the present invention, a Client contacts Sales 105 to sell restricted stock, Sales 105 can pull up a sales module via a graphical user interface (GUI) to access the RSP system 110 and enter data into the restriction checklist. Sales 105 can assist a Client 101 answer restricted transaction related questions to determine qualification and the appropriate rule for sale. If necessary, a four way conference contact can be arranged between the Client 101, Sales 105, Restricted Desk 106, and Client Counsel 102 to finish walking the Client 101 through the restriction checklist. Once the checklist is complete, an appropriate rule for sale will have been identified and the RSP system can inform Sales 105 how to instruct Client 101 regarding forms which should be sent to the financial institution 120, and forms that should be submitted to an RSP system 110. Forms submission can be electronic or via a fax, or physically mailed for physical negotiability documentation. Faxed forms can be received into a fax module. Another embodiment uses a web page to enable the Client 101 and Client Counsel 102 to process the restriction checklist.

Company Counsel 102 can be alerted of a sale via an electronic notification, such as email, and use a hyperlink to log into a RSP system web page containing the appropriate documents and transaction information. Counsel 102 can download faxes from Sales 105 and the Client 101. Company Counsel 102 can complete a Legal Opinion and submit a copy of a signed original to the RSP system 110. In one embodiment, submission can be accomplished via a RSP system fax mailbox. The fax number can be included in the alerting notification. Another embodiment can utilize electronic transfer of a file and an appropriate electronic signature. An alerting notification with hyperlink can also be sent to sales 105 indicating that this step has occurred. If any of the currently manual process steps by the parties of the RSP system are automated, the alerting emails can be replaced with automated information flows to the next party in the process. In such an embodiment, the process becomes completely automated in real time.

Sales 105, or in the case where the RSP system is an independent party from a Broker, a hyperlink can be utilized as an alerting notification to pull up relevant information and map any correspondence, such as a Company Counsel 102 fax relating to the appropriate transaction. Identifying information can appear in the web page. The RSP system 110 can automatically send an alerting notification, such as email, with an associated hyperlink to the Transfer Agent 104.

The Transfer Agent 104 can also activate a hyperlink contained in an alerting email. In response to clicking the hyperlink, the system can automatically log the Transfer Agent 104 into an RSP system 110 website with access to appropriate electronic or fax documentation. The Transfer Agent 104 can download an associated Legal Opinion. An alerting email can be sent to the financial institution's Transfer Custody 108 to indicate that the Transfer Agent 104 has downloaded the Legal Opinion. The Transfer Agent 104 can execute the transfer, and manually update the status through a browser to the RSP system. In the case of a Workflow arrangement between the RSP system and the Transfer Agent, upon executing any internal electronic transfers, this information change would trigger an automated information flow into the RSP system. A similar process and result would occur in the case of a peer-to-peer platform. Transfer Custody 108 can access the RSP system to check on the status of the transaction. Or in the case of full automation, any changes by the transfer status by the Transfer Agent will be noticed by the Workflow or peer-to-peer system and the change captured in the RSP system.

Figure 2:
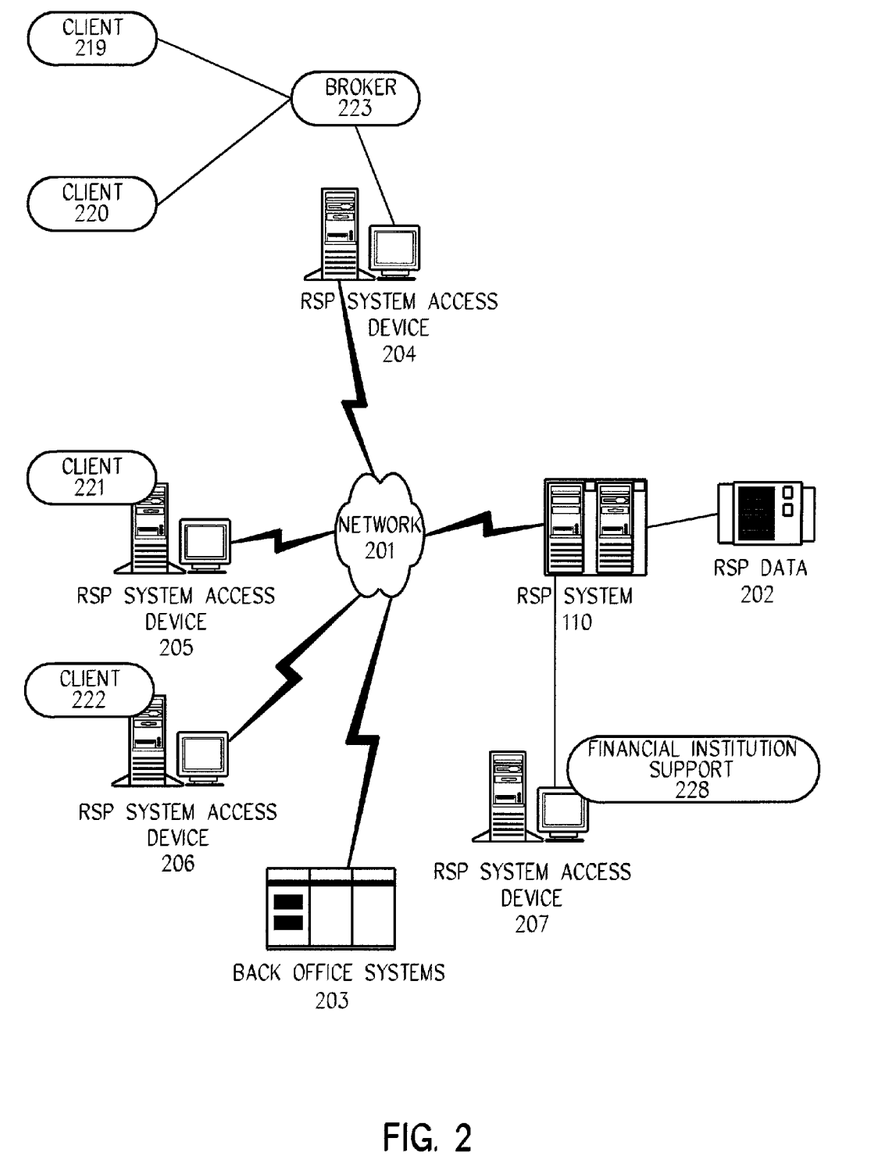
FIG. 2 illustrates a network embodiment of the present invention.

Referring now to FIG. 2, a network diagram illustrating one embodiment of the present invention is shown. An automated restricted securities processing system can include a RSP System 110 accessible via a distributed network 201 such as the Internet, or a private network. A Client 219-222, financial institution support 228, a representative 223-224, or other party interested in a restricted securities transaction, can use a computerized system or network access device 204-208 to receive, input, transmit or view information processed in the RSP system 110. A back office system 203 can also receive and transmit data to the RSP System 203 via the network 201. A protocol, such as the transmission control protocol internet protocol TCPIP can be utilized to provide consistency and reliability.

Each of the network access devices can include a processor, memory and a user input device, such as a keyboard and/or mouse, and a user output device, such as a display screen and/or printer. The network access devices 204-207 can communicate with the RSP system 110 to access data stored at the RSP system 110. The network access device 204-207 may interact with the host computer 250 as if the host was a single entity in the network 200. However, the RSP system 110 may include multiple processing and database sub-systems, such as cooperative or redundant processing and/or database servers that can be geographically dispersed throughout the network 201. In some implementations, groups of network access devices 204-208 may communicate with RSP system 110 through a local area network.

The RSP system 110 includes one or more databases 202 storing data relating to restricted securities processing. The RSP system 110 may interact with and/or gather data from a Client 219-222; representative 223, financial institution support 228 or other person who is operating a network access device 204-207. Data gathered from the trader may be used to conduct trading or provide information to the trader.

Typically a user will access the RSP system 110 using client software executed on the network access device 204-207. The client software may include a generic hypertext markup language (HTML) browser, such as Netscape Navigator or Microsoft Internet Explorer, (a "WEB browser"). The Client software may also be a proprietary browser, and/or other host access software. In some cases, an executable program, such as a Java™ program, may be downloaded from the RSP system 110 to the Client computer and executed at the Client computer as part of the RSP system 110 software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 3:
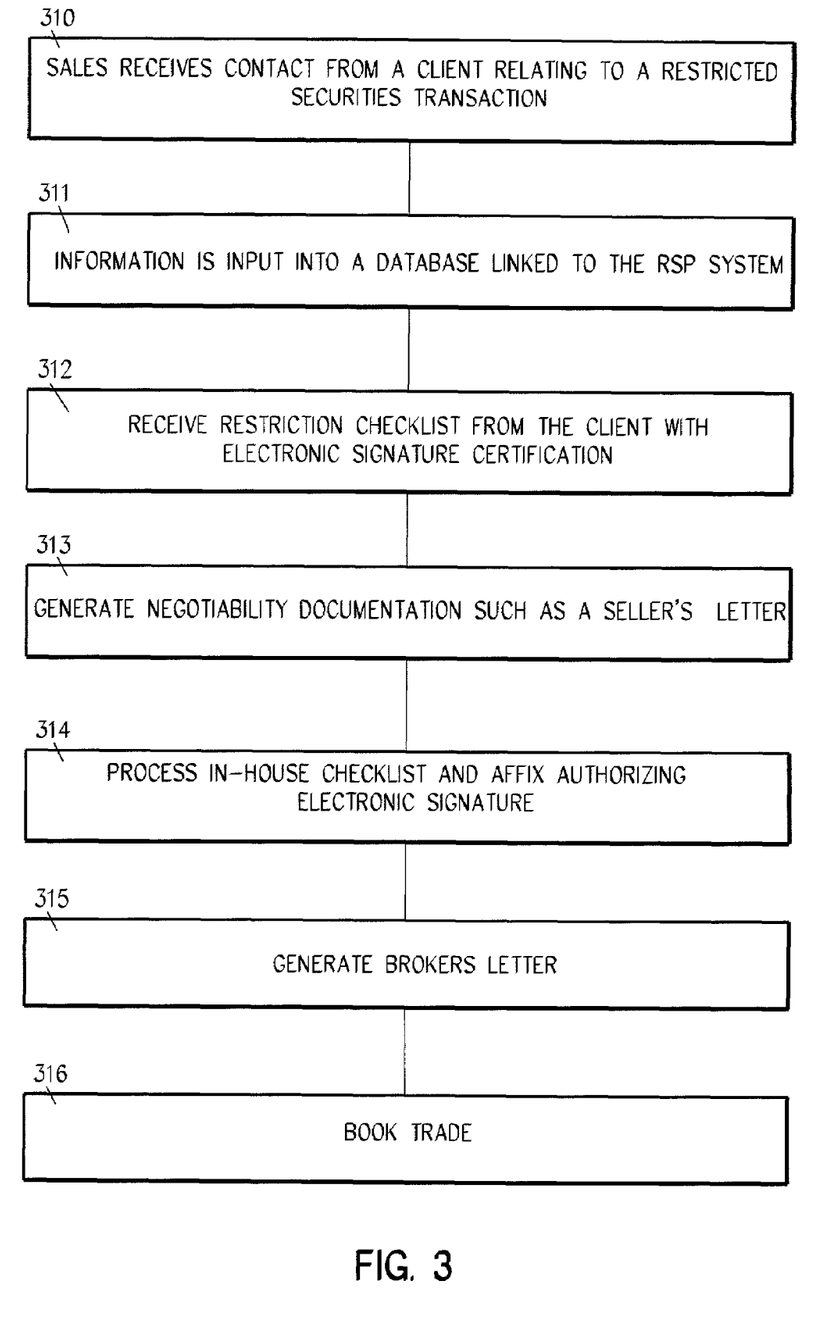
FIG. 3 illustrates a flow diagram of a client contact process according to the present invention.

FIG. 3 illustrates one process relating to client contact that can be included in the present invention. A financial institution 120 can be contacted by a Client 101 relating to the transaction of a restricted security 310. Typically, the Client 101 would contact the financial institution's Sales. Information descriptive of the Client's 101 restriction regarding the transaction is input into the system through a restriction checklist that identifies an appropriate rule for sale and the Client's 101 fulfillment of the requirements under the rule. Information can be input for example into a GUI containing programmable user interactive devices, such as checkboxes, yes/no fields, radial buttons, text input, or other devices. An example of a GUI that can be useful to input information is illustrated in FIG. 4. To aid the Client 101, the sales can instruct the Client 101 on how to logon to a RSP system website and input information relating to restrictions involved in the transaction.

To aid the Client 101, Sales can instruct the Client 101 on how to logon to a RSP system website and input information relating to restrictions involved in the transaction. In one embodiment, a restriction checklist can be presented in a GUI to the Client to facilitate the input of information. If necessary, a four way audio conference with simultaneous web access can be arranged between the Client 101, Sales 105, Restricted Desk 106, and Client Counsel 102 to finish walking the Client 101 through the checklist.

The financial institution 120 can generate or receive required electronic information 312 from the Client 101. Preferably, the information will include an electronic signature verifying that the information submitted is correct. For example, the financial institution 120 can receive an electronically authorized Seller's Representation Letter that is generated by the system in response to completion of a Restriction Checklist. The Client 101 can implement an electronic signature to indicate that the checklist is correct. In addition to the electronically generated and signed Seller's Letter, the system can automatically generate an electronic signature for the negotiability documentation 313. If electronic negotiability documents are being used (such as electronic restricted securities), the electronic signature can automatically be attached to the electronic negotiability documentation, regardless of on whose books and records the security resides.

The financial institution 120 can also walk through its own checklist questions and input related information, such as information necessary to generate a Broker's Letter 314. When all information required for the broker's letter is available in the system, the system can automatically generate the broker's letter and affix an authorized electronic signature 315. Electronic links from the system to trading systems associated with the financial institution 120 can be utilized to book the trade 316. In one embodiment, the RSP system 110 can automatically generate a status report indicating which information has been entered and which information is still outstanding.

Figure 4A:
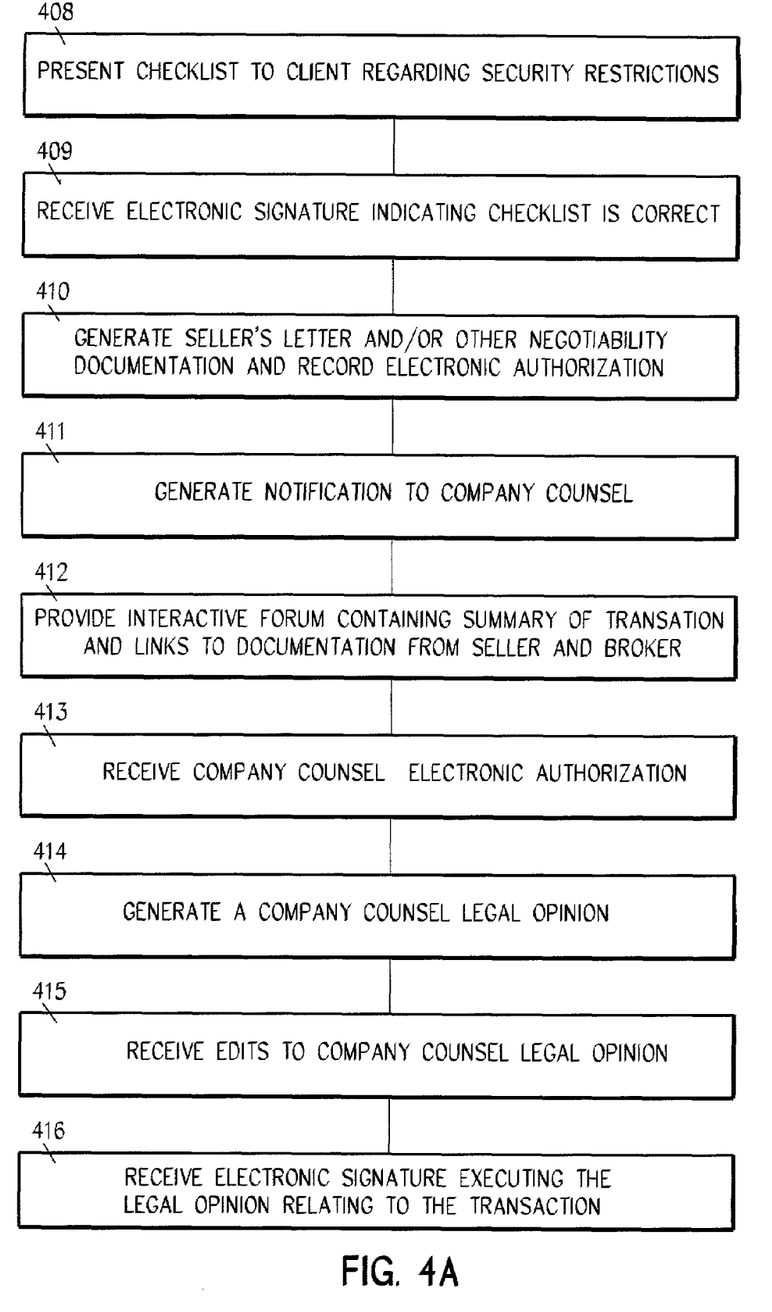
FIGS. 4a and 4b illustrate a flow diagram of steps that can be performed by an automated RSP system.
Figure 4B:
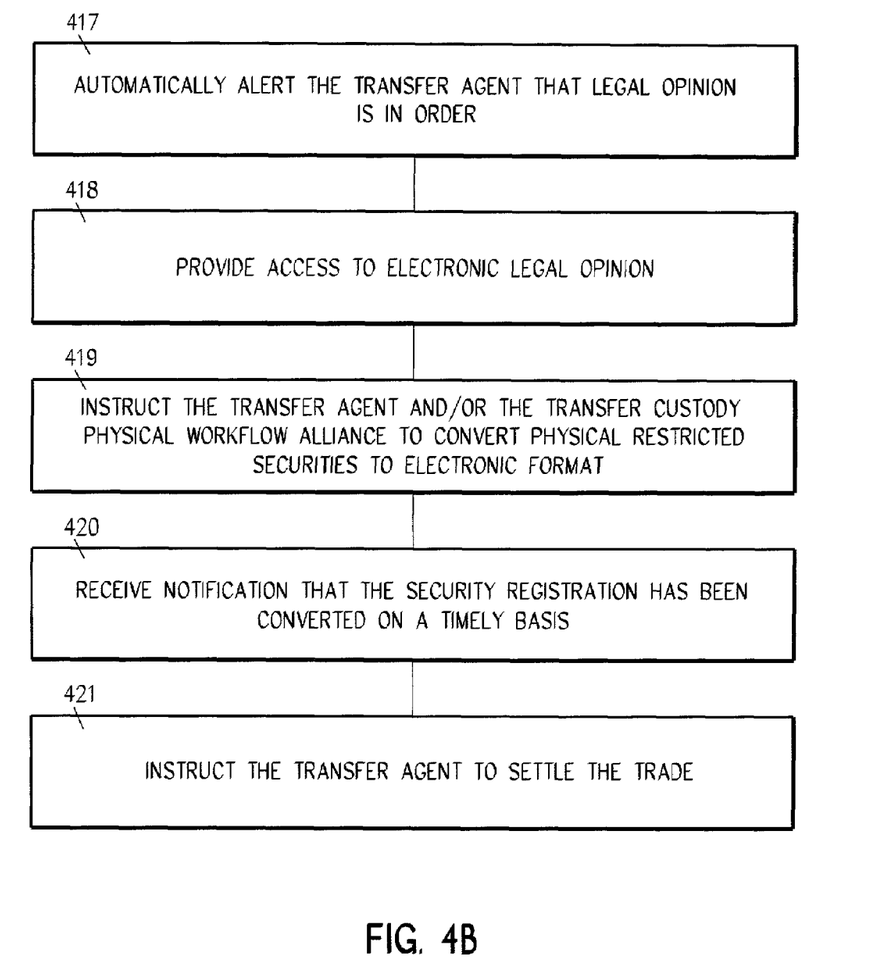

Referring now to FIG. 4, a set of steps that can be performed by an automated RSP system is illustrated. Steps that an RSP system 110 can perform in practicing the present invention can include presenting a checklist 408 relating to restrictions. The checklist can include a series of restriction questions, each question with a corresponding checkbox to record an answer. The RSP system 110 can receive an electronic signature from a Client to indicate that the checklist is correct 409. The RSP system 110 can also automatically generate a legally binding Seller's Letter and other negotiability documentation, which can be reviewed by the Seller such that an electronic signature can be received and recorded indicating an execution of the Seller's Letter 410.

The RSP system 110 Workflow application can shift the process towards a Sales 105 and/or Restricted Securities Desk 106 and present an interface to facilitate a financial institution walking through its own checklist questions. An electronic signature can be received attesting to correct answers. Receipt of the checklist answers and electronic signature can be utilized to trigger the system to automatically create a Broker's Letter. Via workflow the present invention can also tie into the financial institution systems to book the trade.

Receipt of a Seller's Letter with electronic signature can trigger generation of an alerting notification, such as an email, to be sent 411 to Company Counsel 103. In the case of a Workflow or peer-to-peer system arrangement between the two parties an alerting notification can include an automated file transfer or other electronic information flow. The notification can also include a hyperlink, WEB address or other interactive device to direct Company Counsel 103 to material available on a distributed network. Company Counsel 103 can activate the user interactive device, such as by clicking on a hyperlink and be presented with a very simplified but comprehensive format indicating that the Seller and Broker have given authorizations 412. Company Counsel 103 can electronically authorize the transaction based on the website summary page, or hyperlinks to a page showing the documentation from the Seller & Broker 413. In addition, the Company Counsel 103 can download these or other associated documents to its internal document management system. Alternatively, Company Counsel 103 can have a database and programmable system to automatically generate Legal Opinions if certain criteria are satisfactorily answered by the Seller and the Broker. In this case, information in Client and Broker restriction checklists can include criteria, which is sent in an appropriate format to Company Counsel 103 to facilitate its electronic process.

Upon Company Counsel's 103 electronic signature to approve the sale 413, which can be received via the RSP system 110, the system can automatically create a Company Counsel 103 Legal Opinion 414. The opinion can be created, for example, by piecing together standardized language into paragraphs, wherein the language has been previously created and/or approved by Company Counsel 103 and saved in the RSP system 110. In one embodiment, a merge of information specific to a transaction and the standardized language can create the document. Company Counsel 103 can also edit a document prior to its approval 415. If the financial institution desires, the Client 101 can monitor the status of the trade through the RSP system 110 website.

A Client 101 can also send physical documentation to the Transfer Agent 104 and Transfer Custody 108. Generally, if the Client 101 has been a long time customer of the financial institution, Sales 105 may have already facilitated the Client 101 preemptively converting the restricted physical securities to electronic format.

A Company Counsel's 103 electronic approval of the Legal Opinion can be received 416 and cause an alerting notification 417, such as an email, to be sent to the Transfer Agent 104. As in previous steps between external parties in the RSP process, a Workflow application or peer-to-peer computing platform can be used between these two parties to automate this information flow and replace the manual process facilitated by the alerting email with hyperlink. If the Transfer Agent 104 needs more reassurance that the Legal Opinion is in order, the Transfer Agent 104 can use a hyperlink contained within the notification to automatically logon to the RSP system 110 and verify. The Transfer Agent 104 can also be given access to the Legal Opinion 418, such as through an e-mail or hyperlink. In one embodiment, the Legal Opinion can be downloadable, offering the Transfer Agent 104 an opportunity to store the Legal Opinion in an external document management system. The Transfer Agent can then settle the trade using its internal processes & systems.

Electronic, peer-to-peer computing or a Workflow application can facilitate the immediate recognition of the settlement and notify the RSP system 110 and appropriate internal financial institution groups. The internal financial institution groups can proceed with their usual processes to release proceeds to the Client. If the financial institution desires, the Client can monitor the status of the trade through the RSP system 110 website.

Productivity Gains can be realized for Company Counsel, Transfer Agent 104 and Front and Back Office of Broker's operation. Economic Gains can also result from removing lost interest on delayed Client payment.

Figure 5:
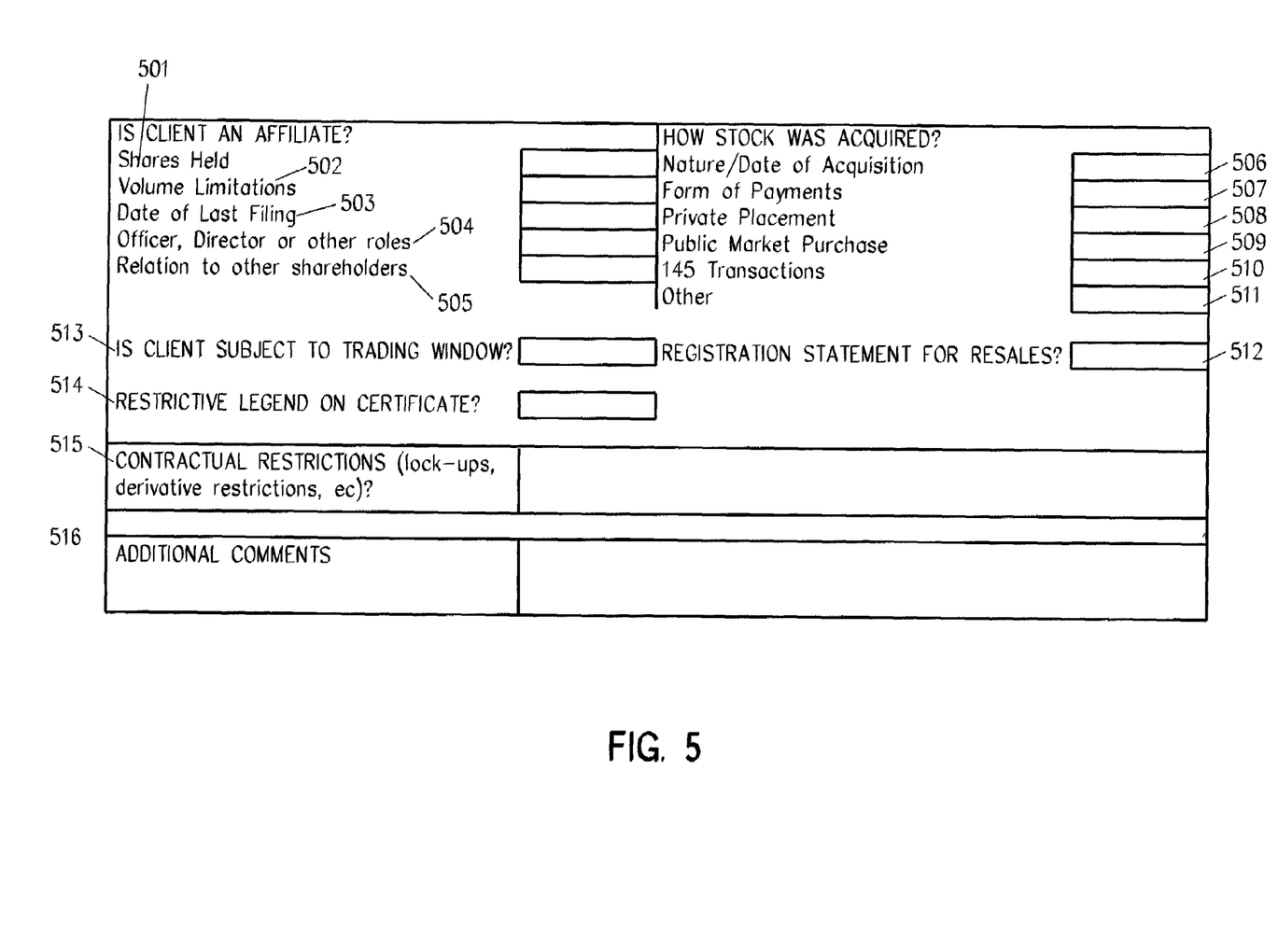
FIG. 5 illustrates a user interface with functionality included in the present invention.

Referring now to FIG. 5, an exemplary interface is shown illustrating various fields 501-516 of information that can be included in an interactive presentation to collect and/or display data. Interactive areas can be included on a screen for accepting data input and displaying information already contained in associated fields. For example, the interface can include an area for inputting shares held 502, volume limitations 502, date of last filing 503, Role 504, relation to shareholders 505, nature/date of stock acquisition 506, form of payment 507, private placement 508, public market purchase 509, 145 transaction 510, or other transaction 511. In addition, the screen can include whether the client is subject to a trading window 513, a registration for resale 512, if there is a restrictive legend on the certificate 514, any contractual restrictions 515, or additional comments 516.

Figure 6:
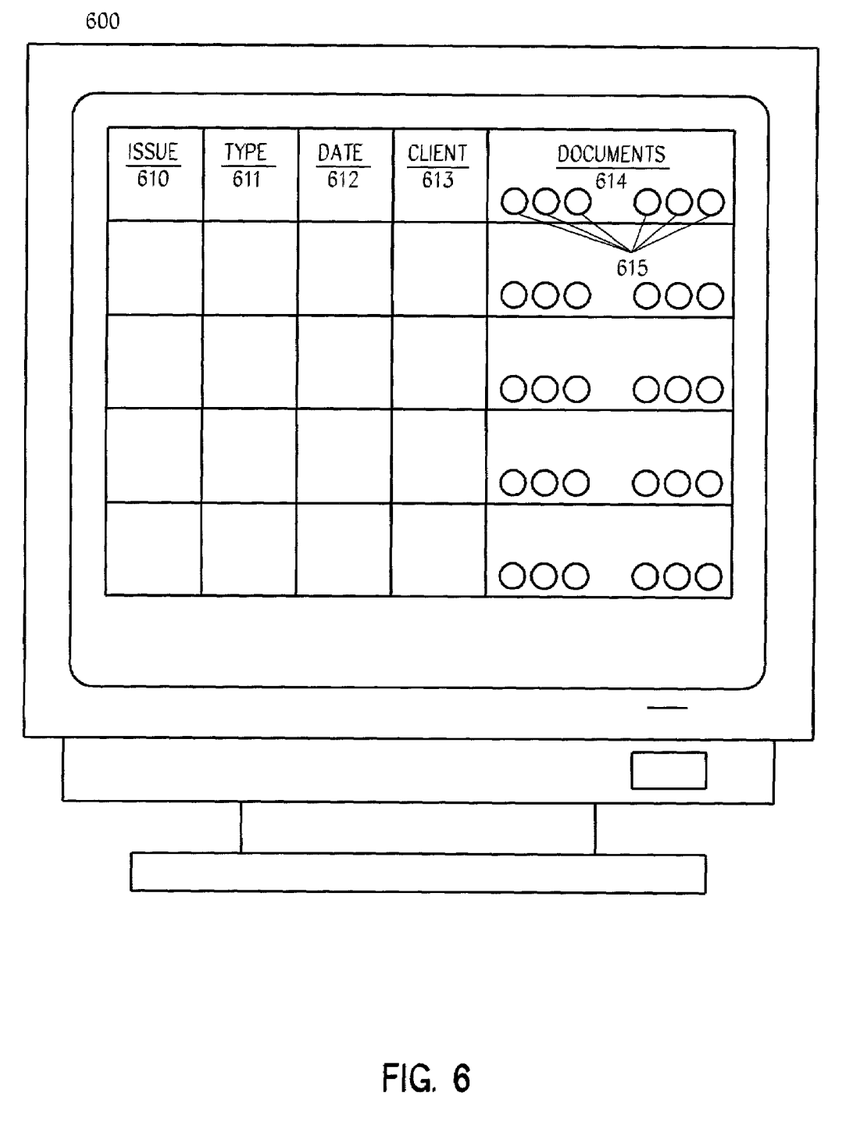
FIG. 6 illustrates an example of a graphical user interface relating to the current invention.

Another exemplary interface, such as that illustrated in FIG. 6 can include a programmable mechanism for presenting, receiving, organizing, sorting, modifying and general editing of information relating to a stock transaction. In particular, a graphical user interface according to the present invention can include an interactive programmable area for receiving and displaying information relating to an issue being sold 610, a restriction type 611, date sold 612, the client 613, documents 614 and icons or other programmable links to related documentation 615. The issue being sold 610 can identify the stock for which shares are going to be sold. The type 611 can be descriptive of the type of restriction that encumbers the stock. Restrictions can include for example, a SEC type restriction, Rule 144 restriction, Rule 145 restriction, Rule 701 restriction, a contractual restriction or other type of restriction. Icons or other programmable interactive device, such as a hyperlink, can be utilized to pull up related documents. For example, an icon may cause a seller letter, broker letter, opinion of counsel, contractual provisions or other document. Documents can be downloaded and stored local to a user for archival purposes.

In addition, the display can be responsive to user interaction to sort by a selected column, to display a checklist associated with a brokers letter or seller's letter, or otherwise provide access to supporting detail.

A number of embodiments of the present invention have been described. Nevertheless, it will be understood that various modifications may be made without departing from the spirit and scope of the invention. For example, client computers 110 203-207 can comprise a personal computer executing an operating system such as Microsoft Windows™, Unix™, Linux or Apple MacOS™, as well as software applications, such as a web browser. RSP access devices 201-207 can also be terminal devices, or a palm-type computer WEB access device that adheres to a point-to-point or network communication protocol such as the Internet protocol. Other examples can include TV WEB browsers; terminals and wireless access devices (such as a 3-Com Palm organizer). A computer may include a processor, RAM and/or ROM memory, a display capability, an input device and hard disk or other relatively permanent storage. Interactive graphical user interfaces specifically related to RSP can include any information contained within databases relating to the RSP or derivative of such information.

Figure 7:
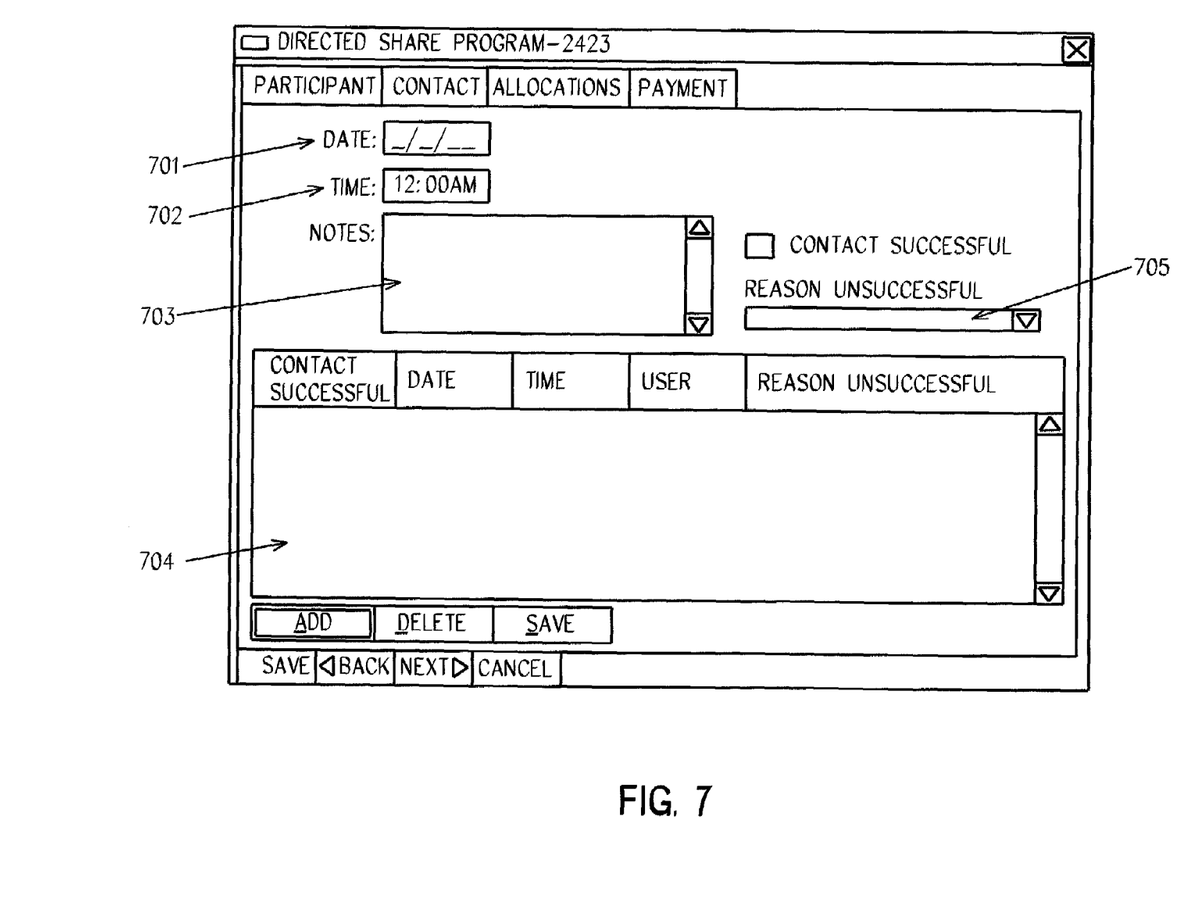
FIG. 7 illustrates aspects of another user interface in accordance with an implementation of the Restricted Securities Processing system.

Referring now to FIG. 7, aspects of another user interface in accordance with an implementation of the RSP system are shown. The interface includes fields admitting inputs for Date 701, Time 702, Notes 703, and Reason Unsuccessful 705. The interface also includes a display area 704 for listings of field values.

Other functionality and details not specifically listed can also be included in the spirit of the present invention. Accordingly, other embodiments are included within the scope of the following claims.

What is claimed is:

1. A computer-implemented method for processing restricted securities trades via computers associated with a communications network, the method comprising:

receiving data relating to restrictions associated with a trade of a security, wherein the trade of the security is based on at least one physical restricted security;

receiving at one of the computers associated with the communications network an electronic verification that the data is correct;

transmitting an instruction to a transfer agent to convert the at least one physical restricted security into an electronic format;

receiving at one of the computers associated with the communications network a notification that the at least one physical restricted security has been converted into an electronic format by the transfer agent;

when the notification has been received, automatically generating, at one of the computers associated with the communications network, documentation supportive of the trade wherein the generated documents include at least a legal opinion indicating whether or not the trade restrictions have been satisfied; and responsive to the generated documentation, receiving at one of the computers associated with the communications network an electronic signature to execute the generated documents.

2. The method of claim 1 wherein the trade comprises a simple restricted sale.

3. The method of claim 1 additionally comprising the step of transmitting an instruction to execute the trade.

4. The method of claim 3 additionally comprising forwarding trade information to a clearing house.

5. The method of claim 1 wherein the data relating to the restrictions comprises a checklist of questions related to restrictions.

6. The method of claim 1 wherein the generated documentation comprises a seller's letter.

7. The method of claim 1 wherein the generated documentation comprises a broker's letter.

8. The method of claim 1 additionally comprising the step of receiving edits to the generated documentation.

9. The method of claim 1 additionally comprising the step of receiving notification that the at least one physical restricted security has been converted.

10. A system for processing restricted securities trades via computers associated with a communications network, comprising:
   a processor;
   a memory in communication with the processor and containing program instructions, wherein the processor executes program instructions contained in the memory and the program instructions comprise instructions configured to:
      receive data relating to restrictions associated with a trade of a security, wherein the trade of the security is based on at least one physical restricted security;
   receive at one of the computers associated with the communications network an electronic verification that the data is correct;
      transmit an instruction to a transfer agent to convert the at least one physical restricted security into an electronic format;
      receive at one of the computers associated with the communications network a notification that the at least one physical restricted security has been converted into an electronic format by the transfer agent;
      automatically generate, at one of the computers associated with the communications network, documentation supportive of the trade when the notification has been received, wherein the generated documents include at least a legal opinion indicating whether or not the trade restrictions have been satisfied; and
      receive at one of the computers associated with the communications network an electronic signature to execute the generated documents in response to receiving the generated documentation.

11. The system of claim 10 wherein the trade comprises a simple restricted sale.

12. The system of claim 10 further comprising at least one instruction to transmit to execute the trade.

13. The system of claim 12 further comprising at least one instruction to forward trade information to a clearing house.

14. The system of claim 10 wherein the data relating to the restrictions comprises a checklist of questions related to restrictions.

15. The system of claim 10 wherein the generated documentation comprises a seller's letter.

16. The system of claim 10 wherein the generated documentation comprises a broker's letter.

17. The system of claim 10 additionally comprising the step of receiving edits to the generated documentation.

18. A processor-accessible medium for processing restricted securities trades via computers associated with a communications network, comprising:
   processor readable instructions stored in the processor accessible medium, wherein the processor readable instructions are issuable by a processor to:
      receive data relating to restrictions associated with a trade of a security, wherein the trade of the security is based on at least one physical restricted security;
      receive at one of the computers associated with the communications network an electronic verification that the data is correct;
      transmit an instruction to a transfer agent to convert the at least one physical restricted security into an electronic format;
      receive at one of the computers associated with the communications network a notification that the at least one physical restricted security has been converted into an electronic format by the transfer agent;
      automatically generate, at one of the computers associated with the communications network, documentation supportive of the trade when the notification has been received, wherein the generated documents include at least a legal opinion indicating whether or not the trade restrictions have been satisfied; and
      receive at one of the computers associated with the communications network an electronic signature to execute the generated documents in response to receiving the generated documentation.

19. A system for processing restricted securities trades via computers associated with a communications network, comprising:
   means for receiving data relating to restrictions associated with a trade of a security, wherein the trade of the security is based on at least one physical restricted security;
   means for receiving at one of the computers associated with the communications network an electronic verification that the data is correct;
   means for transmitting an instruction to a transfer agent to convert the at least one physical restricted security into an electronic format;
   means for receiving at one of the computers associated with the communications network a notification that the at least one physical restricted security has been converted into an electronic format by the transfer agent;
   means for automatically generating, at one of the computers associated with the communications network, documentation supportive of the trade when the notification has been received, wherein the generated documents include at least a legal opinion indicating whether or not the trade restrictions have been satisfied; and
   means for receiving at one of the computers associated with the communications network an electronic signature to execute the generated documents in response to receiving the generated documentation.

* * * * *